(12) United States Patent
Liu

(10) Patent No.: US 9,529,479 B2
(45) Date of Patent: Dec. 27, 2016

(54) TOUCH SENSING METHOD, MODULE, AND DISPLAY

(71) Applicant: Hung-Ta Liu, Zhubei (TW)

(72) Inventor: Hung-Ta Liu, Zhubei (TW)

( * ) Notice: Subject to any disclaimer, the term of this patent is extended or adjusted under 35 U.S.C. 154(b) by 0 days.

(21) Appl. No.: 13/650,823

(22) Filed: Oct. 12, 2012

(65) Prior Publication Data

US 2013/0093724 A1 Apr. 18, 2013

Related U.S. Application Data

(63) Continuation-in-part of application No. 13/336,721, filed on Dec. 23, 2011, and a continuation-in-part of application No. 13/336,355, filed on Dec. 23, 2011, and a continuation-in-part of application No. 13/339,667, filed on Dec. 29, 2011.

(30) Foreign Application Priority Data

Oct. 14, 2011 (TW) .............................. 100137312 A

(51) Int. Cl.
*G06F 3/046* (2006.01)
*G06F 3/044* (2006.01)
*G06F 3/041* (2006.01)

(52) U.S. Cl.
CPC ............... *G06F 3/044* (2013.01); *G06F 3/046* (2013.01); *G06F 3/0412* (2013.01); *G06F 3/0416* (2013.01)

(58) Field of Classification Search
None
See application file for complete search history.

(56) References Cited

U.S. PATENT DOCUMENTS

| 8,411,069 | B1 * | 4/2013 | Huang | 345/175 |
| 2004/0217945 | A1 * | 11/2004 | Miyamoto et al. | 345/173 |
| 2011/0227588 | A1 * | 9/2011 | Chen et al. | 324/654 |

* cited by examiner

*Primary Examiner* — Nicholas Lee
*Assistant Examiner* — Duane N Taylor, Jr.
(74) *Attorney, Agent, or Firm* — The Webb Law Firm

(57) ABSTRACT

A touch sensing method to be implemented by a sensing unit of a touch sensing device is disclosed. The sensing unit is coupled to a plurality of conductor lines of the touch sensing device that extend in a same direction. The method includes: using the sensing unit to provide a sensing signal to at least one of the conductor lines for radiation thereby; and using the sensing unit to receive the radiated sensing signal from at least another one of the conductor lines for sensing a feature parameter associated with the sensing signal received from the at least another one of the conductor lines.

11 Claims, 8 Drawing Sheets

of which are incorporated herein by reference.

TOUCH SENSING METHOD, MODULE, AND DISPLAY

CROSS-REFERENCE TO RELATED APPLICATIONS

This application claims priority of Taiwanese Application No. 100137312, filed on Oct. 14, 2011.

This application is also a continuation-in-part of U.S. patent application Ser. Nos. 13/339,667, 13/336,721, and 13/336,355, filed by the applicant respectively on Dec. 29, 2011, Dec. 23, 2011, and Dec. 23, 2011, the entire disclosures of which are incorporated herein by reference.

BACKGROUND OF THE INVENTION

1. Field of the Invention

This invention relates to a sensing method, and more particularly to a touch sensing method adapted to be applied to a touch sensing display.

2. Description of the Related Art

A touch screen panel is a panel adapted for sensing a touch event resulting from user operation using a finger or a stylus. The user may write or draw on the touch screen panel, or trigger execution of commands through icons being displayed on the touch screen panel. Generally, there are two touch sensing modes applicable to the touch screen panels: the electromagnetic sensing mode and the capacitive sensing mode.

The capacitive sensing mode may be a self-capacitance sensing mode or a mutual-capacitance sensing mode. Referring to FIG. 1, a conventional touch display 900 using the self-capacitance sensing mode is shown to include a plurality of first sensing lines 911, a plurality of second sensing lines 912 crossing the first sensing lines 911, and two sensing circuits 913 respectively coupled to the first and second sensing lines 911, 912. The sensing circuits 913 use the same one of the first sensing lines 911 (or the same one of the second sensing lines 912) to radiate and receive sensing signals, so as to sense change of a current, a frequency, or a magnetic flux associated with the sensing signals from the same one of the first sensing lines 911 (or the same one of the second sensing lines 912), and to compute a position of the touch event.

As for the touch sensing display 900 using the mutual-capacitance sensing mode, one of the first sensing lines 911 is used to radiate the sensing signals, and one of the second sensing lines 912 is used to receive the sensing signals to compute the position of the touch event.

SUMMARY OF THE INVENTION

The object of the present invention is to provide another touch sensing method suitable for implementation by a touch sensing device.

According to the present invention, a touch sensing method is implemented by a sensing unit of a touch sensing device. The sensing unit is coupled to a plurality of conductor lines of the touch sensing device that extend in a same direction. The touch sensing method comprises:

a) using the sensing unit to provide a sensing signal to at least one of the conductor lines for radiation thereby; and b) using the sensing unit to receive the sensing signal provided in step a) from at least another one of the conductor lines for sensing a feature parameter associated with the sensing signal received from the at least another one of the conductor lines.

Another object of the present invention is to provide a touch sensing module for a touch sensing display.

According to another aspect of the present invention, a touch sensing module comprises:

a plurality of first conductor lines extending in a same direction; and a sensing unit coupled to the first conductor lines, and operable to provide a sensing signal to at least one of the first conductor lines for radiation thereby, and to receive the sensing signal provided to the at least one of the first conductor lines from at least another one of the first conductor lines for sensing a feature parameter associated with the sensing signal received from the at least another one of the first conductor lines.

Yet another object of the present invention is to provide a touch sensing display with a touch sensing module.

According to yet another aspect of the present invention, a touch sensing display comprises:

a display module;

a touch sensing module including a plurality of first conductor lines extending in a same direction, and a sensing unit coupled to the first conductor lines; and a control module coupled to the touch sensing module and the display module;

the control module being operable to control the display module for image display during a display time interval;

the control module being further operable to control the touch sensing module, during a capacitive touch sensing time interval, for providing a sensing signal to at least one of the first conductor lines for radiation thereby, and for receiving the sensing signal provided to the at least one of the first conductor lines from at least another one of the first conductor lines for sensing a feature parameter associated with the sensing signal received from the at least another one of the first conductor lines.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
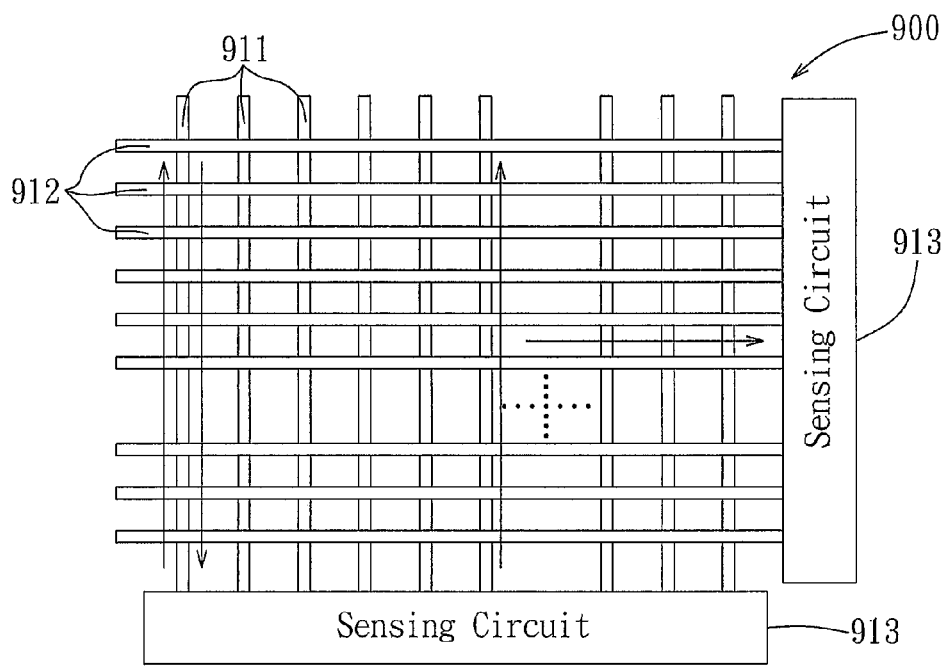
FIG. 1 is a schematic diagram showing a conventional touch sensing display using a self-capacitance sensing mode.
Figure 2:
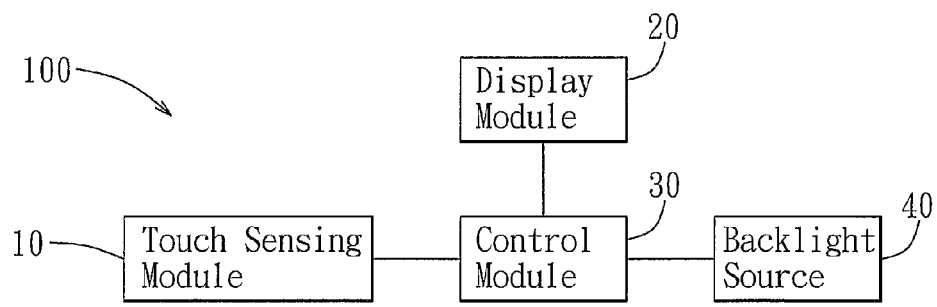
FIG. 2 is a block diagram illustrating first and second preferred embodiments of the touch sensing display according to the present invention.

FIG. 2 shows a first preferred embodiment of the touch sensing display 100 implementing a touch sensing method according to this invention. The touch sensing display 100 is a capacitive touch sensing display adapted for a user to write, to draw, or to trigger execution of commands through a finger touch that results in a sensing signal. The touch sensing display 100 includes a touch sensing module 10, a display module 20, a control module 30 that is coupled to the touch sensing module 10 and the display module 20, and that is operable to control the display module 20 for image display, and a backlight source 40 coupled to the control module 30 for providing light. The touch sensing display 100 may be a liquid crystal display (LCD), an organic light-emitting diode (OLED) display, an electrophoretic display, or an electrowetting display.

Figure 3:
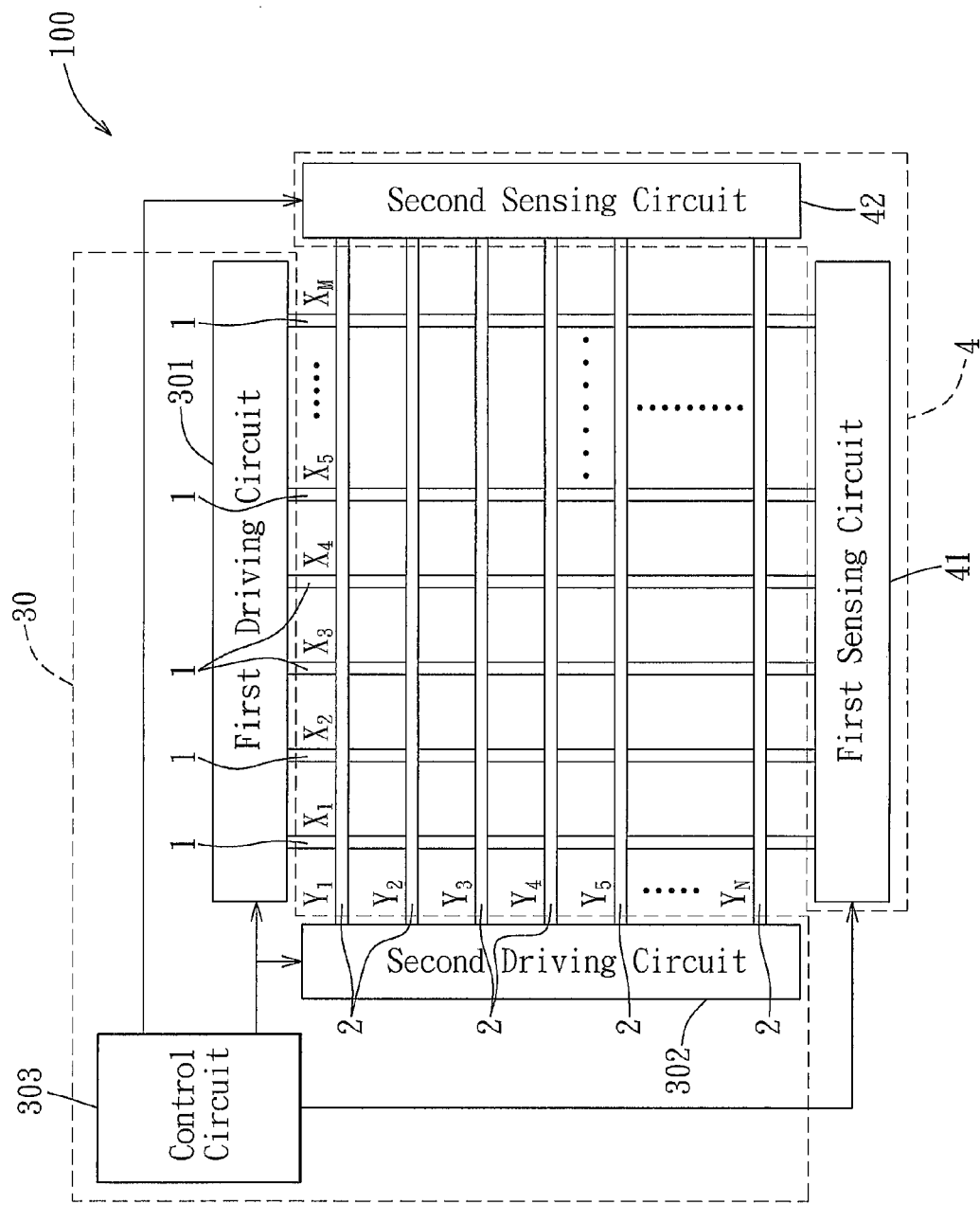
FIG. 3 is a schematic diagram illustrating a circuit structure of a touch sensing module of the first preferred embodiment.

Referring to FIG. 3, the touch sensing module 10 comprises an active matrix that includes a plurality of first conductor lines 1, a plurality of parallel second conductor lines 2, an insulating layer or a dielectric layer (not shown), and a sensing unit 4. In this embodiment, the first conductor lines 1 are data lines having a number M, where M is a positive integer greater than 1, and the first conductor lines 1 are denoted using $X_1 \sim X_M$. Each of the first conductor lines 1 has a width ranging from 4 μm to 10 μm, and a distance between two adjacent first conductor lines 1 ranges from 30 μm to 100 μm. The first conductor lines 1 are arranged parallelly and equidistantly to each other and extend in a first direction. The second conductor lines 2 are gate lines having a number N, where N is a positive integer greater than 1, and the second conductor lines 2 are denoted using $Y_1 \sim Y_N$. Each of the second conductor lines 2 has a width ranging from 4 μm to 10 μm, and a distance between two adjacent second conductor lines 2 ranges from 30 μm to 100 μm. The second conductor lines 2 are arranged parallelly and equidistantly to each other and extend in a second direction crossing the first direction. The insulating layer is disposed between the first conductor lines 1 and the second conductor lines 2, such that the second conductor lines 2 are electrically isolated from the first conductor lines 1, so as to form an M×N sensing matrix.

It should be noted that the first conductor lines 1 are not limited to be the data lines, and the second conductor lines 2 are not limited to be the gate lines. In other embodiments, the first conductor lines 1 may be the gate lines, and the second conductor lines 2 may be the data lines. Moreover, in another architecture of the specific touch sensing display 100, such as a low-temperature poly-silicon thin-film transistor liquid crystal display (LTPS-TFT-LCD) or an active matrix OLED (AMOLED) display, the first and second conductor lines 1, 2 may be selected or modified from power lines, common electrode lines, assist lines, bias lines, read-out lines, control lines, partial pixel circuits, partial assist circuits, partial assist pixels, compensation lines, signal control lines, or assist lines of compensation circuit devices, etc.

Referring to FIGS. 2 and 3, the sensing unit 4 includes a first sensing circuit 41 coupled to one end of the first conductor lines 1, and a second sensing circuit 42 coupled to one end of the second conductor lines 2. The first sensing circuit 41 and the second sensing circuit 42 are used for providing/receiving a sensing signal (also called excitation signal) respectively to/from the first and second conductor lines 1, 2, so as to sense a feature parameter associated with the sensing signal, such as an electric charge, a capacitance, a magnetic flux, an electromagnetic induction, a voltage, a current, a frequency, etc.

The control module 30 includes a first driving circuit 301 coupled to the other end of the first conductor lines 1, a second driving circuit 302 coupled to the other end of the second conductor lines 2, and a control circuit 303 coupled to the sensing unit 4, the first driving circuit 301, and the second driving circuit 302. In this embodiment, the first driving circuit 301 and the second driving circuit 302 respectively are a source driver and a gate driver, which operate and function in a manner known to those skilled in the art. The control circuit 303 is operable to control operation of the sensing unit 4 and other electronic devices, and details of the control operation will be described hereinafter.

Figure 4:
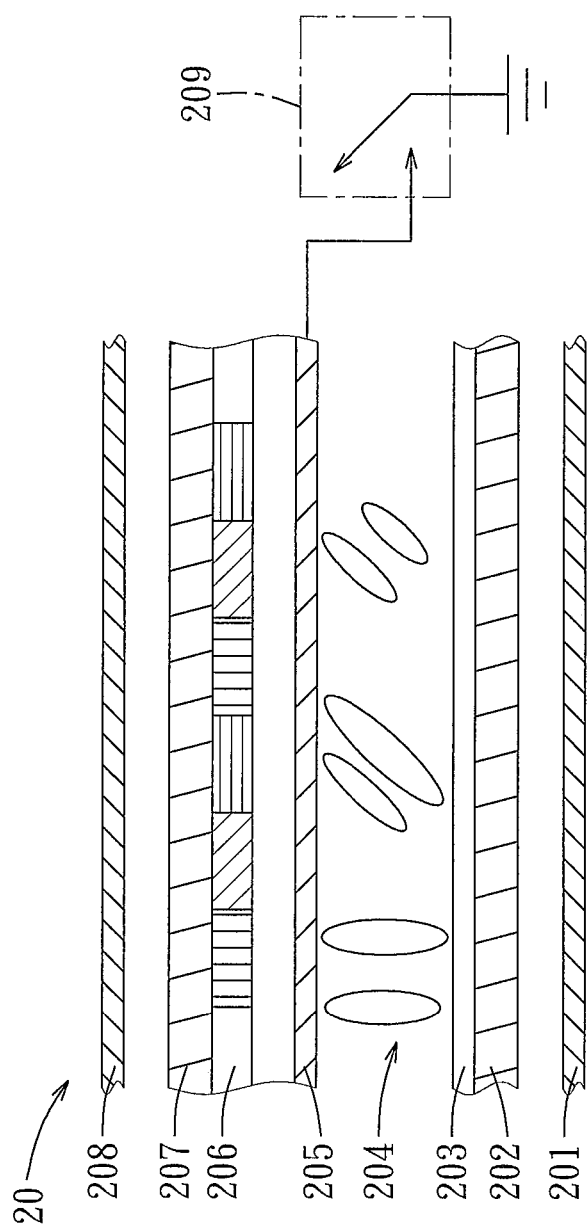
FIG. 4 is a sectional view of a display module implemented using the first preferred embodiment.

Referring to FIG. 4, the display module 20 includes a first polarizer 201, a first substrate 202, a pixel layer 203, a liquid crystal layer 204, a common electrode layer 205, a color filter 206, a second substrate 207, a second polarizer 208, and a grounding switch 209 coupled between the common electrode layer 205 and ground.

In this embodiment, the first and second conductor lines 1, 2 are disposed on the pixel layer 203. The grounding switch 209 is controlled by the control circuit 303 to make or break electrical connection between the common electrode layer 205 and ground, such that the common electrode layer 205 is switched between a floating state and a grounding state. It should be noted that the "grounding state" as used herein is not limited to be coupled to the ground, and may also refer to coupling to a large capacitor, a large conductor, or a metal housing.

In addition, the structure of the display module 20 of this embodiment is not limited to the aforesaid structure. The display module 20 may be an OLED panel, an AMOLED panel, a transmissive panel, a reflective panel, or a transflective panel. The first and second conductor lines 1, 2 are not limited to be disposed only on the pixel layer 203, but may also be disposed at one of an inner side of one of the first and second subtrates 202, 207, and an outer side of one of the first and second substrates 202, 207 as required.

Figure 5:
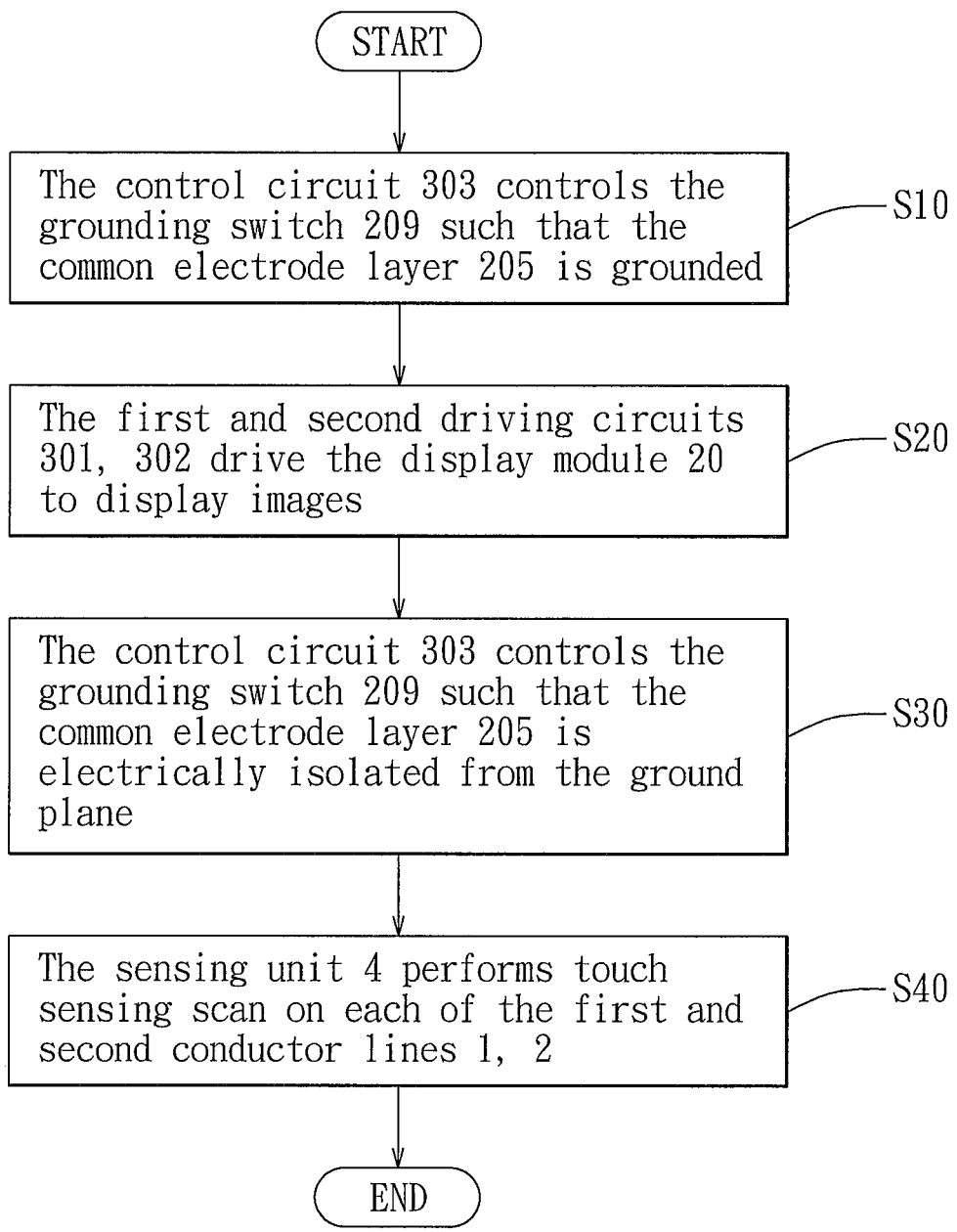
FIG. 5 is a flowchart illustrating steps of the touch sensing method of the first preferred embodiment.
Figure 6:
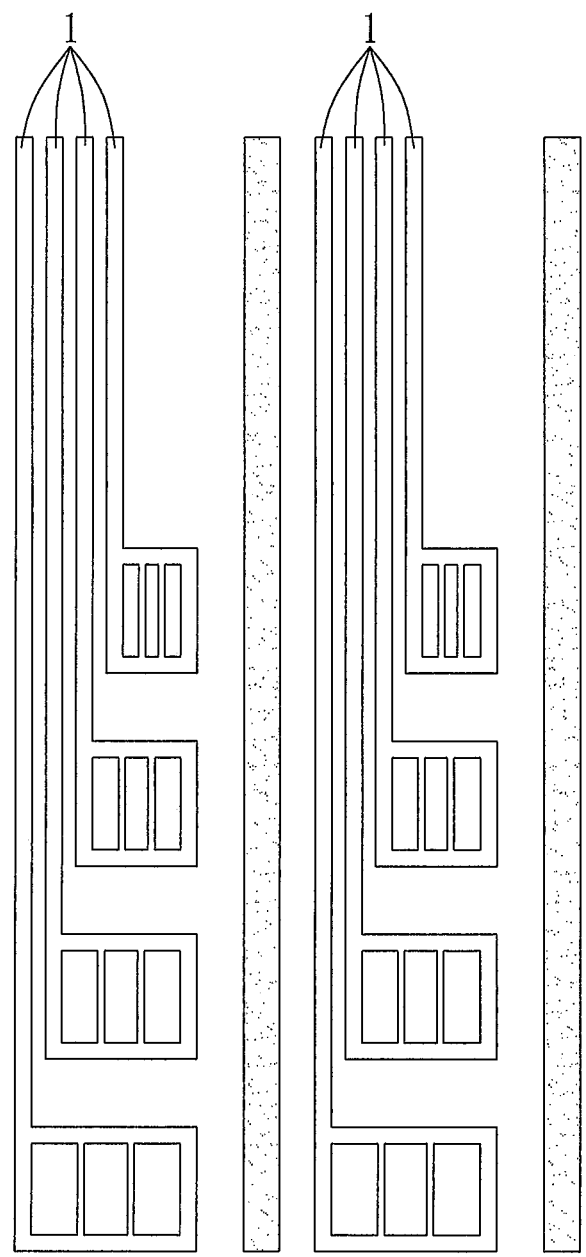
FIG. 6 is a schematic diagram showing first and second patterns of first and second conductor lines of the first preferred embodiment.

Referring to FIGS. 3, 4, and 5, FIG. 5 is a flow chart illustrating steps of the touch sensing method applied to this embodiment of the touch sensing display 100. The steps of the touch sensing method are executed once in a frame period during operation of the display module 20. The frame period is divided into a display time interval and a touch sensing time interval in this embodiment. The steps of the method are described as follows:

Step S10: The control circuit 303 controls the grounding switch 209 such that the common electrode layer 205 is grounded.

Step S20: The first and second driving circuits 301, 302 drive the display module 20 to display images, such that the touch sensing display 100 is operated in the display time interval. During the display time interval, the common electrode layer 205 is grounded, so as to prevent noise interference from the common electrode layer 205 and to obtain better image quality.

Step S30: The control circuit 303 controls the grounding switch 209 such that the common electrode layer 205 is electrically isolated from the ground plane (i.e., floating).

Step S40: The sensing unit 4 performs touch sensing scan on each of the first and second conductor lines 1, 2, such that the touch sensing display 100 is operated in the touch sensing time interval.

In other words, the control module 30 controls the grounding switch 209 to make or break electrical connection according to the display period of the display module 20, so as to optimize control of image display and touch sensing scan. Moreover, during the touch sensing time interval, the control circuit 303 turns off (or dims) output of the backlight source 40. In this embodiment, steps S10~S40 are continuously repeated during operation of the touch sensing display 100.

Because the touch sensing method of this invention is suitable to be independently applied to both of the first conductor lines 1 and the second conductor lines 2, only the first conductor lines 1 are exemplified in the following description of the touch sensing method of the present invention.

Step S40 may be divided into two sub-steps S40-1 and S40-2. In sub-step 40-1, the sensing unit 4 provides the sensing signal to at least one of the first conductor lines 1 for radiation thereby, and in sub-step S40-2, the sensing unit 4 receives the sensing signal provided in step S40-1 from at least another one of the first conductor lines 1 for sensing the feature parameter associated with the sensing signal received from the at least another one of the first conductor lines 1. The sensing unit 4 is then operable to compute a touch event according to the sensing signal received in step S40-2. The feature parameter may be an electric charge, a capacitance, a magnetic flux, an electromagnetic induction, a voltage, a current, a frequency, etc.

Referring to FIG. 3, the sensing unit 4 may perform the touch sensing method using any one of the following implementations:

1. The sensing unit 4 provides the sensing signal to one of the first conductor lines 1 (such as $X_1$) for radiation thereby, and receives the sensing signal provided to the first conductor line $X_1$ from another one of the first conductor lines 1 (such as $X_2$), so as to sense a signal variation of the first conductor line $X_2$. Following the same scheme, the sensing unit 4 then provides the sensing signal to the first conductor line $X_2$ for radiation thereby, and receives the sensing signal provided to the first conductor line $X_2$ from the first conductor line $X_3$. By analogy, all of the first conductor lines 1 may complete touch sensing scan in sequence.

2. The sensing unit 4 provides the sensing signal to one of the first conductor lines 1 (such as $X_1$) for radiation thereby, and receives the sensing signal provided to the first conductor line $X_1$ from a plurality of other ones of the first conductor lines 1 (such as $X_2$~$X_5$). By the "single radiation, multiple reception" manner, all of the first conductor lines 1 may complete touch sensing scan in sequence.

3. The sensing unit 4 provides the sensing signal to a plurality of the first conductor lines 1 (such as $X_1$~$X_4$) for radiation thereby, and receives the sensing signal provided to the first conductor lines $X_1$~$X_4$ from another one of the first conductor lines 1 (such as $X_5$). By the "multiple radiation, single reception" manner, all of the first conductor lines 1 may complete touch sensing scan in sequence.

4. The sensing unit 4 provides the sensing signal to a plurality of the first conductor lines 1 (such as $X_1$~$X_2$) for radiation thereby, and receives the sensing signal provided to the first conductor lines $X_1$~$X_2$ from a plurality of other ones of the first conductor lines 1 (such as $X_3$~$X_4$). In other words, the first conductor lines 1 include a plurality of conductor groups, and each of the conductor groups includes at least two of the first conductor lines 1. For example, the conductor groups include a first group (such as $X_1$~$X_2$), a second group (such as $X_3$~$X_4$), a third group (such as $X_5$~$X_6$), and a fourth group (such as $X_7$~$X_8$). In a first application, the sensing unit 4 provides the sensing signal to the first group, and receives the sensing signal from the second group. Then, the sensing unit 4 provides the sensing signal to the second group, and receives the sensing signal from the third group, followed by providing the sensing signal to the third group, and receiving the sensing signal from the fourth group. In a second application, the sensing unit 4 provides the sensing signal to the first group, and receives the sensing signal from the second group. Then, the sensing unit 4 provides the sensing signal to the third group, and receives the sensing signal from the fourth group. In a third application, the sensing unit 4 provides the sensing signal to the first group, and receives the sensing signal from the third group. Then, the sensing unit 4 provides the sensing signal to the second group, and receives the sensing signal from the fourth group. By the "multiple radiation, multiple reception" manner, all of the first conductor lines 1 may complete touch sensing scan in sequence. Moreover, the first conductor lines 1 among the conductor groups (i.e., the first, second, third, and fourth groups) may have one of the following relations: a) at least one of the first conductor lines 1 in one of the conductor groups is shared with another one of the conductor groups (for example, the first group includes the first conductor lines $X_1$~$X_4$, and the second group includes the first conductor lines $X_3$~$X_6$); b) the first conductor lines 1 in one of the conductor groups are included in another one of the conductor groups (for example, the second group includes the first conductor lines $X_3$~$X_6$, and the third group includes the first conductor lines $X_2$~$X_8$); and c) the first conductor lines 1 in each of the conductor groups are not shared with other ones of the conductor groups (for example, the first group includes the first conductor lines $X_1$~$X_2$, and the second group includes the first conductor lines $X_3$~$X_4$). It should be noted that the conductor group that is provided with the sensing signal by the sensing unit 4 may also be spaced apart from the conductor group from which the sensing unit 4 receives the sensing signal. For example, in the first implementation, the first group includes the first conductor lines $X_1$~$X_2$, and the second group includes the first conductor lines $X_5$~$X_6$.

5. This implementation also conforms to the "multiple radiation, multiple reception" manner. The difference from the fourth implementation is that the first conductor lines 1 in the conductor group that is provided with the sensing signal by the sensing unit 4 are at least partially interlaced with the first conductor lines 1 in the conductor group from which the sensing unit 4 receives the sensing signal. For example, the sensing unit 4 provides the sensing signal to the first conductor lines $X_1$, $X_3$ for radiation thereby, and receives the sensing signal provided to the first conductor lines $X_1$, $X_3$ from the first conductor lines 1 $X_2$, $X_4$, $X_5$. By this manner, all of the first conductor lines 1 may complete touch sensing scan in sequence.

In addition, each of the first conductor lines 1 and the second conductor lines 2 may have a pattern selected from a strip, a rhombus, a grid, a rectangle, and combinations thereof.

Due to high layout density of the first conductor lines 1 (i.e., 30 μm~100 μm between two adjacent first conductor lines 1), when a user's finger touches the panel (i.e., display module 20), it covers a range including a plurality of the first conductor lines 1. Therefore, the first conductor line 1 that radiates the sensing signal may be designed to be spaced apart by at least another one of the first conductor lines 1 from the first conductor line 1 from which the sensing unit 4 receives the sensing signal. For example, the sensing unit 4 provides the sensing signal to the first conductor line $X_1$ for radiation thereby, and receives the sensing signal provided to the first conductor line $X_1$ from the first conductor line $X_4$. The sensing unit 4 then provides the sensing signal to the first conductor line $X_4$ for radiation thereby, and receives the sensing signal provided to the first conductor line $X_4$ from the first conductor line $X_7$, and so on. Therefore, it is not necessary to complete touch sensing scan on all of the first conductor lines 1, so as to save number and time of touch sensing scan, and the sensing unit 4 can still compute the touch event according to the received sensing signal.

Referring to FIG. 5, since the floating state of the common electrode layer 205 is for preventing the sensing unit 4 from being interfered by the common electrode layer 205 during reception of the sensing signal, the common electrode layer 205 needs to be in the floating state only during reception of the sensing signal by the sensing unit 4. Therefore, during the touch sensing time interval, the sensing unit 4 may use any one of the aforesaid five implementations to provide the sensing signal, and the control circuit 303 then controls the grounding switch 209 to break electrical connection and result in the floating state of the common electrode layer 205, followed by reception of the sensing signal by the sensing unit 4.

Figure 7:
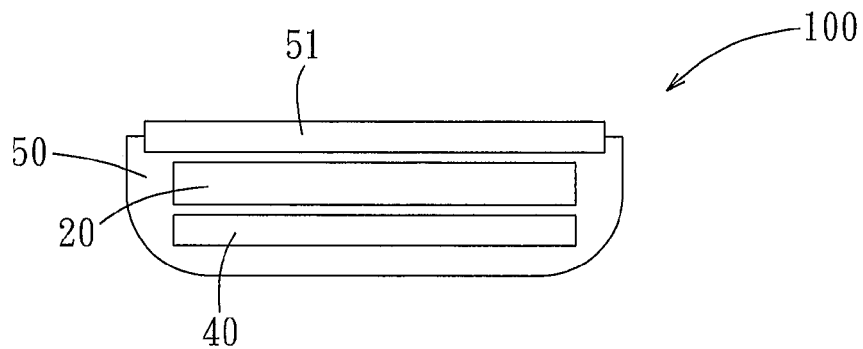
FIG. 7 is a schematic diagram of the touch sensing display of the first preferred embodiment.

Further referring to FIG. 7, the touch sensing display 100 further includes a housing 50 for the touch sensing module 10 (not shown in FIG. 7), the display module 20, the control module 30 (not shown in FIG. 7), and the backlight source 40 to be disposed therein. The housing 50 includes a protective panel 51 disposed at a position corresponding to the display module 20. In this embodiment, the protective panel 51 is a cover glass, which may be shaped into an oval shape, a substantially rectangular shape, a polygonal shape, an arc shape, etc., and which has an area greater than a display area of the display module 20. The sensing unit 4 of the touch sensing module 10 may be disposed between the protective panel 51 and the display module 20, may be disposed on a side wall of the protective panel 51 apart from the display module 20, or may be disposed in the protective panel 51 (the protective panel could be formed with a multi-layer structure), so as to reduce overall thickness of the touch sensing display 100 and to reduce cost of manufacturing.

Figure 8:
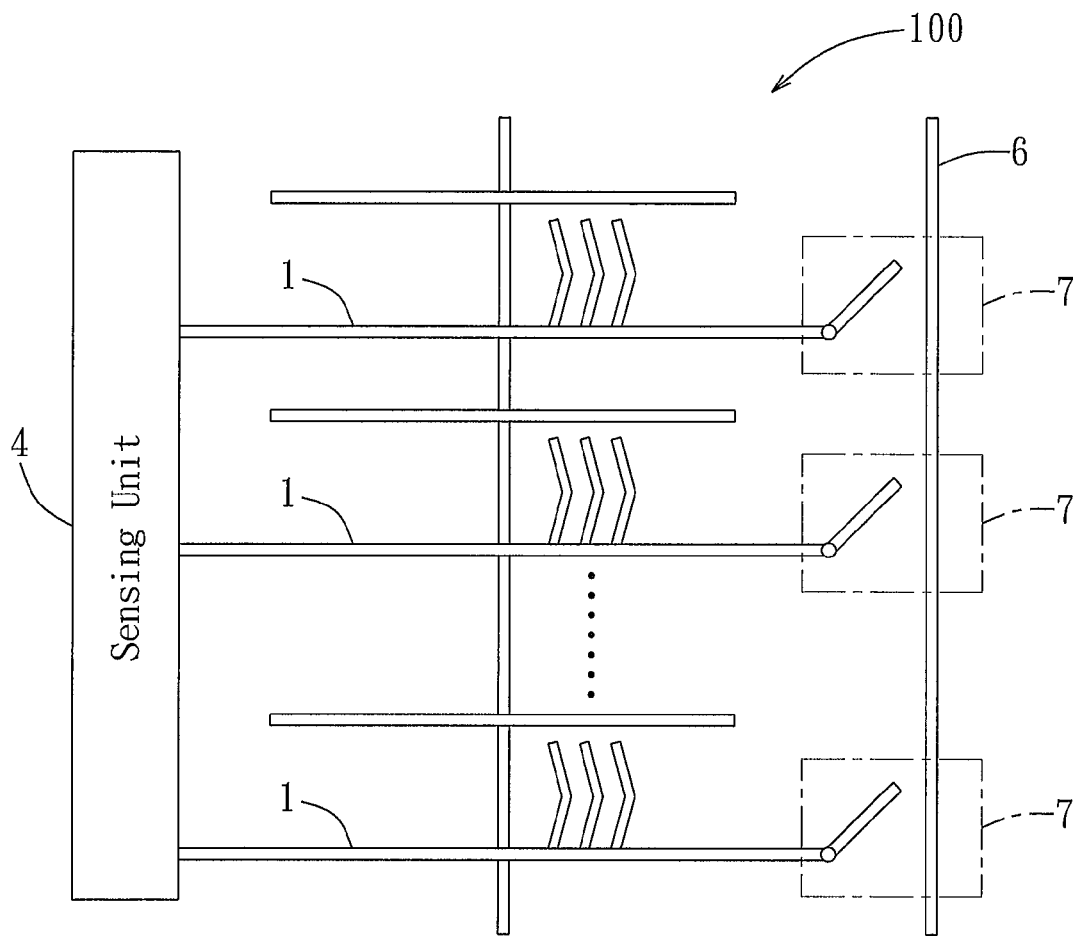
FIG. 8 is a schematic diagram illustrating a circuit structure of the touch sensing module of the second preferred embodiment of the touch sensing display according to the present invention.

FIG. 8 shows a second preferred embodiment of the touch sensing display 100 that implements the method according to this invention. In this embodiment, the display module 20 (as shown in FIG. 2) is formed using a fringe field switching (FFS) architecture that integrates the pixel layer 203 and the common electrode layer 205 at a same layer.

The overall architecture of the second preferred embodiment is shown in FIG. 2 to include a touch sensing module 10, a display module 20, a control module 30 that is coupled to the touch sensing module 10 and the display module 20, and that is operable to control the display module 20 for image display, and a backlight source 40 coupled to the control module 30 for providing light. The touch sensing module 10 includes a plurality of parallel first conductor lines 1, a plurality of parallel second conductor lines 2 (not shown in FIG. 8) crossing and electrically isolated from the first conductor lines 1, a sensing unit 4, a sensing conducting line 6, and a plurality of switch circuits 7. Each of the switch circuits 7 is operable to make or break electrical connection between the sensing conducting line 6 and a respective one of the first conductor lines 1, or between the sensing conducting line 6 and a respective one of the second conductor line 2. The following description of the touch sensing method uses only the first conductor lines 1 as an example, but the touch sensing method is also suitable to be applied to the second conductor lines 2.

Referring to FIGS. 3, 4, and 8, the touch sensing method implemented by the second preferred embodiment of the touch sensing display 100 is similar to the first preferred embodiment. The frame period is divided into the display time interval and the touch sensing time interval. In this embodiment, the touch sensing time interval is further divided into a capacitive touch sensing time interval and an electromagnetic touch sensing time interval. The control module 30 controls the grounding switch 209 to make electrical connection between the common electrode layer 205 and ground during the display time interval. The sensing unit 4 then performs one of the aforesaid five implementations for capacitive touch sensing of the touch event, and the control module 30 then controls the switch circuit 7 to break electrical connection between the first conductor lines 1 and the conducting sensing line 6 for the sensing unit 4 to sense the feature parameter associated with the sensing signal, and to compute the touch event according to the received sensing signal during the capacitive touch sensing time interval.

During the electromagnetic touch sensing time interval, the control module 30 controls the switch circuits 7 to make electrical connection between the sensing conducting line 6 and at least two of the first conductor lines 1 for forming an electromagnetic sensing loop, such that the sensing unit 4 provides the sensing signal from one of said at least two of the first conductor lines 1, and receives the sensing signal from the other one of said at least two of the first conductor lines 1, so as to compute the touch event according to the received sensing signal. In detail, the first conductor lines 1 are grouped into a plurality of conductor groups. Each of the conductor groups includes at least two of the first conductor lines 1. The control module 30 is operable to control the switch circuits 7 to make electrical connection between the sensing conducting line and each of the conductor groups according to a predetermined sequence for forming a plurality of the electromagnetic sensing loops in sequence, such that the sensing unit 4 is operable to provide the sensing signal to the electromagnetic sensing loops formed according to the predetermined sequence and to compute the touch event according to changes in the sensing signal on the electromagnetic sensing loops during the electromagnetic touch sensing time interval.

Figure 9:
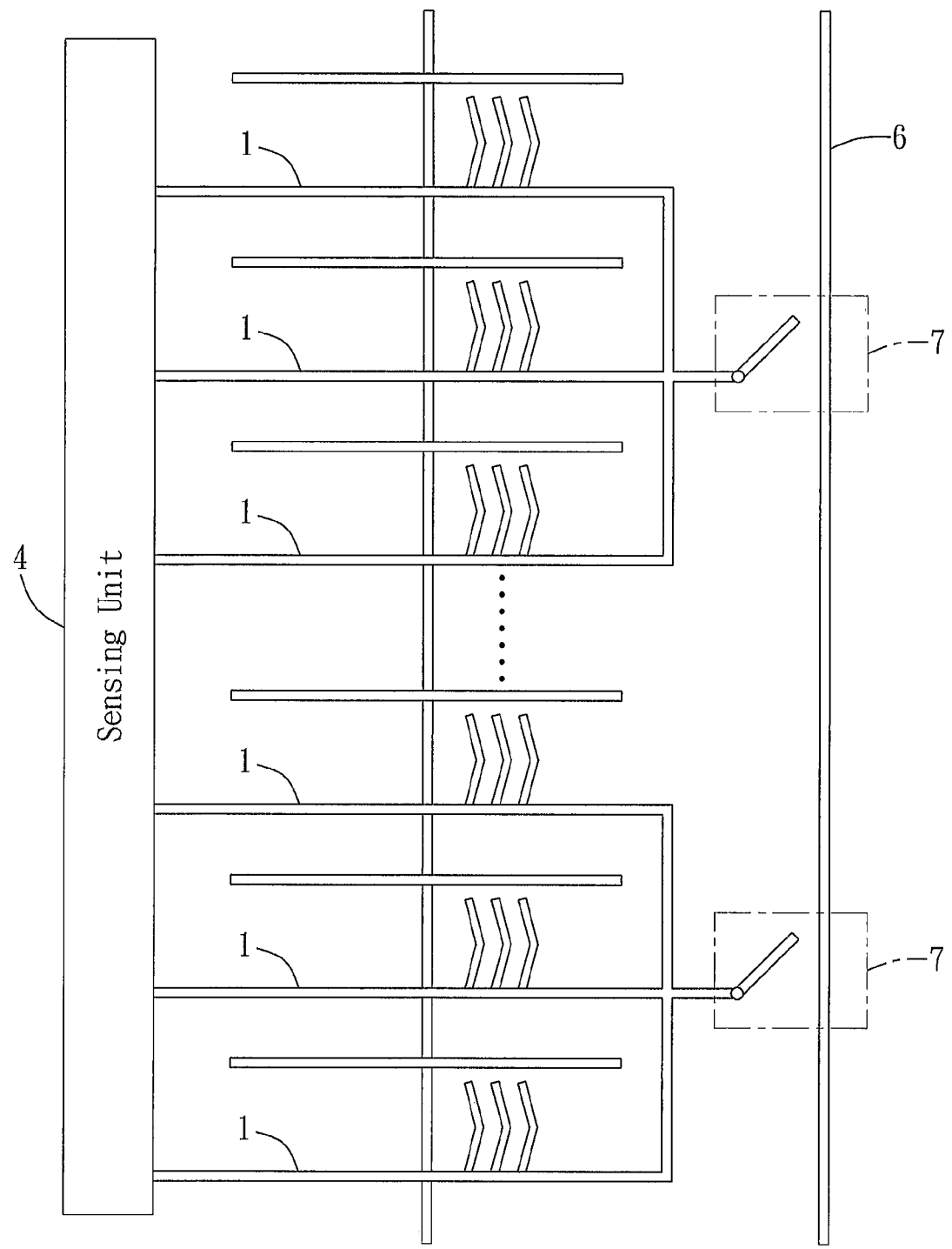
FIG. 9 is a schematic diagram illustrating a modification of the circuit structure of the touch sensing module of the second preferred embodiment.
Figure 10:
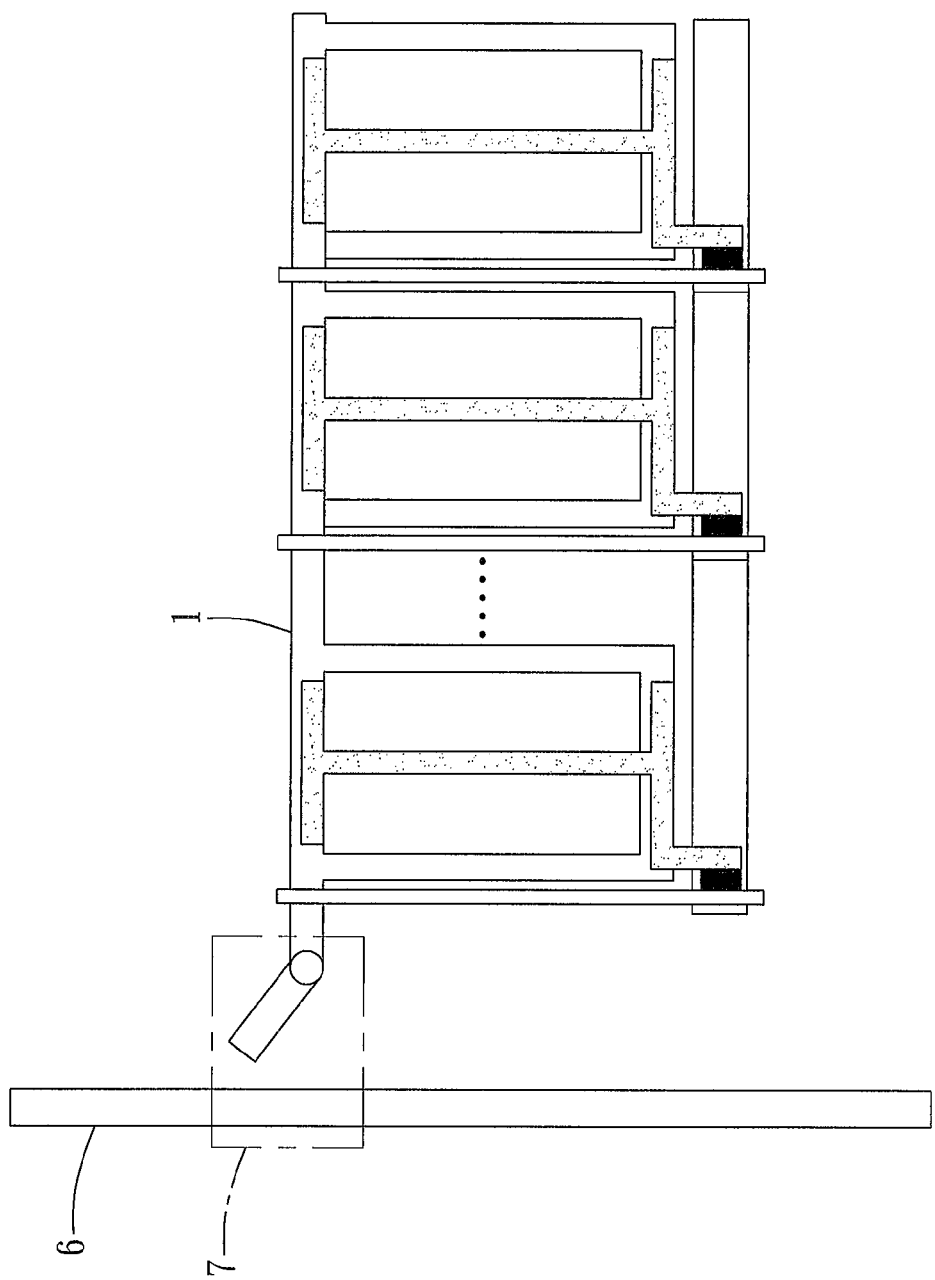
FIG. 10 is a schematic diagram showing the display module of the second preferred embodiment having an in-plane switching architecture.

It should be noted that, in this embodiment, the switch circuits 7 are not required to have a one-to-one correspondence with the first conductor lines 1. Referring to FIG. 9, one switch circuit 7 may coupled to a plurality of the first conductor lines 1, such that the sensing unit 4 may provide/receive the sensing signal to/from these first conductor lines 1 at the same time. In addition, as shown in FIG. 10, the display module 20 of this embodiment may have an in-plane switching (IPS) architecture to achieve optimal control of touch sensing scan. Moreover, the display module 20 includes a dummy pixel region. The switch circuits 7 and the sensing conducting line 6 may be disposed at the dummy pixel region to further save space and reduce manufacturing cost.

To sum up, the touch sensing display 100 implementing the touch sensing method according to this invention employs the conventional data lines and gate lines as the first and second conductor lines 1, 2 for touch sensing scan, and uses one of the aforesaid five implementations that provides the sensing signal to at least one of the conductor lines, and receives the sensing signal from at least another one of the conductor lines for sensing the feature parameter associated with the sensing signal. In addition, the control module 30 controls the grounding switch 209 to make or break electrical connection between the common electrode layer 205 and ground according to operation of the display module 20, so as to optimize control between image display and touch sensing scan.

While the present invention has been described in connection with what are considered the most practical and preferred embodiments, it is understood that this invention is not limited to the disclosed embodiments but is intended to cover various arrangements included within the spirit and scope of the broadest interpretations and equivalent arrangements.

What is claimed is:

1. A touch sensing display comprising:
   a display module;
   a touch sensing module including a plurality of first conductor lines extending in a same direction, and a sensing circuit coupled to said first conductor lines, said first conductor lines being electrically isolated from each other during a capacitive touch sensing time interval; and
   a control circuit coupled to said touch sensing module and said display module;
   said control circuit being operable to control said display module for image display during a display time interval;
   said control circuit being further operable to control said touch sensing module, during the capacitive touch sensing time interval, to provide a sensing signal to at least one of said first conductor lines for radiation thereby, and to receive the sensing signal provided to said at least one of said first conductor lines from at least another one of said first conductor lines for sensing one of an electric charge, a capacitance, a voltage, a current, and a frequency that is associated with the sensing signal received from said at least another one of said first conductor lines,
   wherein said touch sensing module further includes: a sensing conducting line and a plurality of switch circuits, each operable to make or break electrical connection between said sensing conducting line and a respective one of said first conductor lines; said control circuit being further operable to control said switch circuits, during an electromagnetic touch sensing time interval, to make electrical connection between said sensing conducting line and at least two of said first conductor lines for forming an electromagnetic sensing loop, not electrically connected with ground, which starts from and ends at the sensing circuit, such that the sensing circuit provides the sensing signal from one of said at least two of the first conductor lines, and receives the sensing signal from the other one of said at least two of the first conductor lines, so as to compute the touch event according to the received sensing signal.

2. The touch sensing display as claimed in claim 1, wherein said first conductor lines are grouped into a plurality of conductor groups, each including at least two of said first conductor lines, said control circuit being operable to control said switch circuits to make electrical connection between said sensing conducting line and each of said conductor groups according to a predetermined sequence for forming a plurality of the electromagnetic sensing loops in sequence, said sensing circuit being further operable, during the electromagnetic touch sensing time interval, to provide the sensing signal to the electromagnetic sensing loops formed according to the predetermined sequence and to compute a touch event according to changes in the sensing signal on the electromagnetic sensing loops.

3. The touch sensing display as claimed in claim 1, wherein said display module includes a dummy pixel region, said switch circuits and said sensing conducting line being disposed at said dummy pixel region.

4. The touch sensing display as claimed in claim 1, further comprising a plurality of parallel second conductor lines that are coupled to said sensing circuit and that cross and are electrically isolated from said first conductor lines, said touch sensing module further including: a sensing conducting line; and a plurality of switch circuits, each operable to make or break electrical connection between said sensing conducting line and a respective one of said second conductor lines; said control circuit being further operable to control said switch circuits, during an electromagnetic touch sensing time interval, to make electrical connection between said sensing conducting line and at least two of said second conductor lines for forming an electromagnetic sensing loop.

5. The touch sensing display as claimed in claim 4, wherein said second conductor lines are grouped into a plurality of conductor groups, each including at least two of said second conductor lines, said control circuit being operable to control said switch circuits to make electrical connection between said sensing conducting line and each of said conductor groups according to a predetermined sequence for forming a plurality of the electromagnetic sensing loops in sequence, said sensing circuit being further operable, during the electromagnetic touch sensing time interval, to provide the sensing signal to the electromagnetic sensing loops formed according to the predetermined sequence and to compute a touch event according to changes in the sensing signal on the electromagnetic sensing loops.

6. The touch sensing display as claimed in claim 4, wherein said display module includes a dummy pixel region, said switch circuits and said sensing conducting line being disposed at said dummy pixel region.

7. The touch sensing display as claimed in claim 1, wherein said display module includes a first substrate and a second substrate opposite to said first substrate, said touch sensing module being disposed at one of an inner side of one of said first and second substrates, and an outer side of one of said first and second substrates.

8. The touch sensing display as claimed in claim 1, further comprising a housing, and a backlight source disposed in said housing and coupled to said control circuit, said control circuit being operable to dim or turn off output of said backlight source when operated in the capacitive touch sensing time interval, and to turn on output of said backlight source when operated in the display time interval.

9. The touch sensing display as claimed in claim 8, wherein said housing further includes a protective panel, said first conductor lines being disposed on said protective panel.

10. The touch sensing display as claimed in claim 1, wherein said display module includes a common electrode layer, said touch sensing display further comprising a grounding switch coupled between said common electrode layer and to one of a ground, a conductor, and a capacitor; wherein said control circuit controls said grounding switch such that said common electrode layer is electrically isolated from said one of the ground, the conductor, and the capacitor when said sensing circuit receives the sensing signal; and wherein said control circuit controls said grounding switch such that said common electrode layer is electrically coupled to said one of the ground, the conductor, and the capacitor when said display module displays images.

11. A touch sensing display comprising:
   a display module;
   a touch sensing module including a plurality of first conductor lines extending in a same direction, and a sensing circuit coupled to said first conductor lines, said first conductor lines being electrically isolated from each other during a capacitive touch sensing time interval; and
   a control circuit coupled to said touch sensing module and said display module, said control circuit being operable to control said display module for image display during a display time interval, said control circuit being further operable to control said touch sensing module, during the capacitive touch sensing time interval, to provide a sensing signal to at least one of said first conductor lines for radiation thereby, and to receive the sensing signal radiated by said at least one of said first conductor lines from at least another one of said first conductor lines for sensing one of an electric charge, a capacitance, a voltage, a current, and a frequency that is associated with the sensing signal received from said at least another one of said first conductor lines
   wherein said touch sensing module further includes: a sensing conducting line and a plurality of switch circuits, each operable to make or break electrical connection between said sensing conducting line and a respective one of said first conductor lines; said control circuit being further operable to control said switch circuits, during an electromagnetic touch sensing time interval, to make electrical connection between said sensing conducting line and at least two of said first conductor lines for forming an electromagnetic sensing loop, not electrically connected with ground, which starts from and ends at the sensing circuit, such that the sensing circuit provides the sensing signal from one of said at least two of the first conductor lines, and receives the sensing signal from the other one of said at least two of the first conductor lines, so as to compute the touch event according to the received sensing signal.

* * * * *